Patented Feb. 24, 1942

2,274,551

UNITED STATES PATENT OFFICE 2,274,551

DERIVATIVES OF RESINS AND THEIR PREPARATION

William O. Kenyon, Louis M. Minsk, and George P. Waugh, Rochester, N. Y., assignors to Eastman Kodak Company, Rochester, N. Y., a corporation of New Jersey No Drawing. Application June 30, 1939, Serial No. 282,316

14 Claims. (Cl. 260—152)

This invention relates to the products prepared from polymers containing a benzenoid nucleus which comprises nitrating them, subsequently reducing the nitrated product and if desired diazotizing and coupling with azo dye-forming compounds. The large molecular compounds which can be chemically joined with a color-forming compound have become of especial importance. By chemically incorporating the color it is more stable than in the case of a physical mixture.

One object of our invention is to prepare compounds which are capable of combining with dye-forming compounds. Another object of our invention is to prepare highly colored compounds having a large molecular structure. Another object of our invention is to prepare compounds to which various characteristics may be imparted by subsequent reduction, diazotization and combining with various compounds. Another object of our invention is to prepare resins containing aromatic amino groups. A further object of our invention is to provide a process for preparing useful derivatives of polymers containing benzenoid groups therein. A still further object of our invention is to provide a dispersing agent for water-insoluble materials. Other objects will appear herein.

We have found that if a styrene-maleic anhydride or styrene-maleic acid resin or a polymer containing a benzenoid group therein is treated with a nitrating agent such as fuming nitric acid, nitro groups are introduced forming a nitrated resin. The nitration progresses up to about one nitro group per benzenoid unit, by using fuming nitric acid. In general the procedure for nitration is to treat the resin in a weight to volume ratio of 1:5 to 1:4 with fuming nitric acid depending upon the viscosity of the resin, although this varies with different resins. The ratio used is sufficient to keep the mass fluid.

We have found that if the nitrated resin is reduced such as by subjecting it to a reducing action such as of a metal such as tin or iron in an acid medium, the action of chemical reducing agents such as alkaline sodium hydrosulfite or to an electro-reduction, that an amino resin results. We have found that this amino resin may be diazotized and then reacted with various compounds to form a highly colored material or a material having other valuable properties. The amino resin may be diazotized by the use of acid and a nitrite such as sodium nitrite, accompanied by cooling. The diazonium compound formed is preferably cooled until acted upon in the desired manner. The amino resin may also be diazotized in aqueous solution by means of oxides of nitrogen. We have found that the amino resins as described are suitable for use as a dispersing agent for micro crystals of silver halides to prevent agglomeration of particles. In this way a finely divided dispersion may be obtained.

Examples II, III and IV, illustrate the nitration of styrene maleic anhydride resins. The use of a shorter time of nitration or milder conditions than specified will result in nitration of the resin to a lesser extent. Example I illustrates a method by which a styrene-maleic anhydride resin may be prepared.

Example I

A mixture of 49 parts of practical granulated maleic anhydride and 52 parts of styrene which had been redistilled in vacuum was slowly warmed using a water bath with frequent shaking under a refluxing condenser. When the temperature of the water bath had reached 92° C., the reaction had taken place and the contents of the flask had solidified. The material was heated for an hour longer. It was then cooled, dissolved in acetone and precipitated in cold distilled water. The partly dried resin obtained was extracted with ether and dried at about 50° C. Analysis of this resin indicated a combined maleic anhydride content of 44.4%.

Example II

This example illustrates the nitration of a styrene-maleic anhydride resin at an elevated temperature. Two parts of a styrene-maleic anhydride resin such as prepared in Example I were dissolved in 10 parts of hot nitrobenzene by stirring their mixture at 100° C. 10 parts of fuming nitric acid (spec. gravity 1.5) was stirred in and the mass was kept at 100° C. for one-half hour with frequent stirring. The mass was then diluted with an equal volume of concentrated nitric acid and was precipitated in cold water. The product was washed, dissolved in a mixture of acetone, pyridine and acetic acid and re-precipitated in cold distilled water. The product was washed with distilled water, dried at about 50° C., extracted with ether and then dried in the open air. Analysis of the product showed it contained 6.03% nitrogen.

Example III

This example shows the nitration of a styrene-maleic anhydride resin at ordinary temperature without a diluent. 2 parts of a styrene-maleic anhydride resin, such as prepared in Example I, were dissolved in 10 parts of fuming nitric acid by stirring without the application of heat. After standing under room conditions, with occasional stirring, for 24 hours, the mass was diluted with nitric acid, precipitated, washed, redissolved and re-precipitated, washed, dried, ether extracted, and dried again. Analysis of the nitrated styrene-maleic anhydride heteropolymer formed gave a nitrogen content of 5.93%.

Example IV

Two parts of a styrene-maleic anhydride resin were treated with 10 parts of fuming nitric acid at 100° C. for one hour with frequent stirring. The product was isolated in the same manner as in the preceding examples. The product was found to have a nitrogen content of 5.91%.

The nitrated products obtained were somewhat fluffy, slightly yellow resins that burned fitfully with considerable evolution of oxides of nitrogen. With lesser amounts of fuming nitric acid, a smaller percentage of combined nitrogen is present in the product. For instance, using only 2 parts of fuming nitric acid, diluent having been used, a product having a nitrogen content of only 1.44% was obtained; using 4 parts of fuming nitric acid, products having nitrogen contents of 2.46%, 2.73% and 3.56% were obtained.

After the maleic anhydride styrene heteropolymer has been nitrated, it may then be reduced to form an amino styrene-maleic acid heteropolymer. This reduction may be carried out as follows:

Example V 247 grams of nitrated styrene-maleic anhydride heteropolymer containing 6.08% nitrogen were dispersed in 1500 cc. of dioxane and 200 cc. of water. 200 grams of mossy tin were added and the reaction mixture was placed on a steam bath under a reflux condenser. When the reaction mixture was refluxing, 1000 cc. of concentrated hydrochloric acid were added quite rapidly yet not rapidly enough to cause any precipitation. When all the tin had been dissolved, a fresh portion of 200 grams of mossy tin was added and an additional liter of concentrated hydrochloric acid. The reaction was then heated for 2 hours. The mass was filtered and precipitated in a large excess of acetone with rapid stirring. After thorough washing with acetone, the precipitate was dried under vacuum at room temperature. The water soluble resin thus obtained contained 4.19% of amino nitrogen.

Example VI

Instead of hydrochloric acid, the reduction was carried out using hydrobromic acid. 123½ grams of nitrated styrene-maleic anhydride heteropolymer which contained 5.82% nitrogen were dispersed by refluxing on a steam bath in 750 cc. of 1,4-dioxane and 100 cc. of water. When the dispersion was complete, 100 grams of mossy tin were added and after refluxing had begun, 760 cc. of 48% hydrobromic acid were slowly added. After ½ hour of heating, a fresh portion of 100 grams of mossy tin and 760 cc. of 48% hydrobromic acid were added. The mass was further heated for 1¾ hours. It was then cooled, filtered and precipitated in a large volume of acetone. The precipitate was filtered, thoroughly washed with acetone and dried in a continuous vacuum over calcium chloride. The water soluble resin thus obtained contained 3.64% of amino nitrogen.

Example VII

The aminostyrene-maleic acid heteropolymer may also be prepared as the free amine by an alkaline sodium hydrosulfite reduction as follows:

123½ grams of nitrostyrene-maleic anhydride heteropolymer containing 5.75% nitrogen were dissolved in 1225 cc. of distilled water containing 55 grams of sodium carbonate. To aid solution, the mass was heated to boiling. When the polymer had completely dissolved, with the reaction mixture gently boiling, 309 grams of a mixture, prepared by grinding together 330 grams of sodium hydrosulfite and 205 grams of sodium carbonate, were added portionwise. After a time the mass changed from a deep brown to a lemon yellow. The mass was boiled gently for an additional 20 minutes and then cooled. It was then made just acid to Congo red indicator with 48% hydrobromic acid, filtered, and precipitated in a large amount of methyl alcohol. The precipitate was filtered and washed thoroughly with methyl alcohol. It was dried in a vacuum at room temperature. In order to remove any salts which might be retained by the polymer, the product was dissolved in 10 parts of distilled water and dialyzed through a regenerated cellulose membrane three thousandths of an inch thick. The aqueous dispersion was precipitated in a large excess of a mixture of ether and 95% ethyl alcohol (50/50% by volume). The product was washed with ether and dried in a vacuum. The resulting water soluble resin contained 2.41% amino nitrogen.

The amino products prepared by the examples of the preceding paragraphs may be used as dispersing agents for water-insoluble materials. If desired, the amino group may be diazotized and coupled with an organic compound to produce a colored resin in which the chemical constituent of the resin responsible for the color is an integral part of the polymeric unit. For example, if the amino resin is diazotized and coupled with alpha naphthol, a brilliant red resin results. The diazotized resin can be coupled with a large number of organic compounds to produce colored resins having a wide variety of colors. For example, the following types of compounds may be coupled with the diazotized resin.

1. Aromatic diamines, such as o- or p-phenylene diamine.
2. Alkylated aromatic amines, such as o-toluidine.
3. Sulphonic acid derivatives of aromatic amines, such as amino G salt, H acid, naphthionic acid.
4. Nitro derivatives of aromatic amines as p-nitro aniline.
5. Phenols and naphthols.
6. Sulphonic acid derivatives of the phenols and naphthols, such as, 2, 6, 8-naphthol disulfonic acid.
7. Napththoic acids as hydroxy naphthoic acid.
8. Diphenyl amine and its derivatives.

Compounds which are suitable for use in producing azo-dyes may be employed in producing colored resins in accordance with our invention.

The following example illustrates the preparation of a resin-dye compound in accordance with our invention:

Example VIII 50 grams of hydrochloride of the aminostyrene-maleic acid heteropolymer, prepared as described above, were dispersed in 250 cc. of distilled water containing 62.5 cc. of concentrated hydrochloric acid. Ice was added to this dispersion. When the reaction solution was cold, 20% sodium nitrite solution was slowly added until a blue coloration was obtained when a drop of the reaction mixture was placed upon starch-iodide paper.

The diazotized dispersion obtained was added to a solution of 22 grams of resorcinol in 500 cc. of distilled water and a large excess of sodium carbonate. This solution had been chilled by the addition of ice and was kept strongly alkaline with sodium carbonate throughout the entire addition of the diazotized solution. The solution was then centrifuged to remove an insoluble portion which was formed during the coupling. The clear brown supernatant liquid was acidified to Congo red with hydrochloric acid. A very finely divided brick red precipitate was formed. This precipitate was filtered from the liquid, washed with water and dried. The product was found to be partially soluble in sodium hydroxide and not soluble in distilled water or in dilute hydrochloric acid.

When the diazotized compound is coupled with an aromatic amine, some modifications in the above-mentioned procedure are necessary. An example of combining a diazotized compound with an aromatic amine is as follows:

Example IX

A cold diazotized solution of 5 grams of the hydrobromide of an aminostyrene maleic acid heteropolymer in dilute hydrochloric acid was chilled with ice and added to an iced solution of 3 grams of toluidine in 50 cc. of water containing just enough hydrochloric acid to cause solution of the amine. After mixing, a saturated solution of sodium acetate in water was added slowly until the solution was neutral to Congo red. An orange precipitate formed due to the coupling of the two components. The precipitate was filtered off, washed thoroughly with water and dried at an elevated temperature.

The above description in terms of styrene-maleic anhydride resins is for the purpose of illustrating the invention. As pointed out before, other resins having a benzenoid ring may be employed, including those in which the benzenoid ring is attached to the hydrocarbon resin chain in different ways. For example, hydrocarbon resins with benzene rings attached to the chain by carbon to carbon linkages, such as polystyrene or polydihydronaphthalene, may be employed. Resins with the benzenoid group as a fundamental part of the chain, such as phenol-formaldehyde polymer, or resins where the benzenoid ring is connected to the linear portion of the polymer by amide formation, such as polyacrylanilide, may be employed. All of these types of resins were found to be capable of nitration. Some of the resins which are suitable for use as the starting material in the process of our invention are:

1. Polydihydronaphthalene.
2. Styrene-methyl acrylate which may be prepared by co-polymerizing the monomers.
3. Styrene-methyl methacrylate which may be prepared by co-polymerizing the monomers.
4. Dihydronaphthalene-maleic anhydride which may be prepared by heteropolymerizing dihydronaphthalene and maleic anhydride.
5. Coumarone-indene resins.
6. Polyacrylanilide which may be prepared by reacting polyacrylyl chloride and aniline.
7. Soluble phenol-formaldehyde resins.
8. Polystyrene resins.
9. Styrene-acrylic acid which may be prepared by the alkaline hydrolysis in pyridine of the styrene-methyl acrylate co-polymer followed by acidification to liberate the resin as a free acid.

The general method of nitration employed was as follows:

The resin was treated with fuming nitric acid in a weight: volume ratio of one part of resin to four or five parts of fuming nitric acid. As a violent reaction often takes place, the resin was added to the nitric acid in portions. When all the resin had been added to the nitric acid, a clear brown dope was obtained. The reaction mixture was then heated on the steam bath for about three hours after which, if it was necessary, it was diluted with concentrated nitric acid and precipitated in a large excess of distilled water. The precipitated nitrated resin was filtered from the solution and washed with distilled water until free from acid. It was dried at room temperature. The following resins were nitrated in this manner:

| | Resins | Nitrogen content of nitrated resin |
|---|---|---|
| | | Percent |
| 1 | Styrene-methyl acrylate resin | 8.5 |
| 2 | Styrene-methyl methacrylate resin | 7.5 |
| 3 | Polystyrene | 11 |
| 4 | Styrene-acrylic acid resin | 8.7 |
| 5 | Dihydronaphthalene-maleic anhydride resin | 6.7 |

With the remaining resins listed, modification of the nitration method was desirable. The polydihydronaphthalene was nitrated by dispersing 50 grams in 200 cc. of nitrobenzene and then adding thereto, slowly and carefully to avoid a violent reaction, 100 cc. of fuming nitric acid. After all the nitric acid had been added, the mass was permitted to stand at room temperature for 16 hours. The nitrated resin was precipitated in 95% ethyl alcohol, washed with 95% alcohol and dried at room temperature. It contained 8.01% of combined nitrogen.

The coumarone-indene co-polymer was nitrated by adding 100 grams of the resin in portions to 400 cc. of fuming nitric acid. A very vigorous reaction occurred giving a red brown dope. The reaction was permitted to stand at room temperature. As the reaction spent itself and the dope cooled, it became cloudy and there appeared to be precipitation. At this stage, the solution was poured into 3.5 liters of distilled water. The precipitated product obtained was filtered from the liquid, washed thoroughly with distilled water and dried at room temperature. It contained 10.7% of combined nitrogen.

The polyacrylylanilide was nitrated as follows:

Five grams of polyacrylylanilide were added portionwise to 25 cc. of fuming nitric acid, cooled by an ice bath. During this addition, the temperature of the nitrating acid was kept below 15° C. The resin, on striking the acid, turned brown and dispersed giving a brown dope. When all the polymer had been added, the mass was allowed to warm to room temperature. The mass was then diluted with an equal volume of concentrated nitric acid and precipitated in 2 liters of distilled water. The precipitate was filtered from the water, washed with distilled water and dried at room temperature. The nitrated resin contained 15.3% of combined nitrogen.

A phenol-formaldehyde resin was nitrated by slowly adding 100 grams of resin to 400 cc. of fuming nitric acid. When about half of the resin had been added, a product began to precipitate from the dope. 250 cc. more of fuming nitric acid was added and then the rest of the powdered resin. A deep brown dope was obtained. The mass was permitted to stand at room temperature and as it cooled, precipitation occurred. The liquid, with its precipitated resin, was then poured into 3.5 liters of distilled water. A bright yellow precipitate was filtered from the water, washed free from acid with distilled water and dried at room temperature. The nitrated resin contained 8.2% of combined nitrogen.

The reduction of these nitrated compounds with tin and hydrochloric acid, as described for the nitrated styrene-maleic anhydride resin was found to be ordinarily suitable for reducing the nitrated resins generally. However, in the case of individual compounds, it was necessary to modify the process here and there.

The reduction of the nitrated polydihydronaphthalene was carried out as follows:

20 grams of the nitrated resin were dispersed in 200 cc. of 1,4-dioxane. A clear deep sherry colored dope was obtained. 20 grams of mossy tin were then added and the mass was placed over a steam bath under a reflux condenser. When the reaction mixture was hot, 100 cc. of concentrated hydrochloric acid were added portionwise through the condenser. When the tin had been consumed, 20 grams more were added together with an additional 100 cc. of concentrated hydrochloric acid. The reaction mass was heated for three hours. A deep brown dope was obtained which was filtered and precipitated in a mixture of equal parts by volume of acetone and ethyl ether. The precipitate was washed with acetone, redissolved in distilled water and again precipitated in acetone and then dried. The resulting resin contained about 6% of amino nitrogen.

Part of the reduced resin was dispersed in water, acidified with hydrochloric acid and chilled. It was then diazotized by the addition of 10% sodium nitrite solution and coupled with β-naphthol in an excess of sodium hydroxide. A dark wine-red resin dye precipitated from the resin.

The reduction of the nitrated styrene-methyl methacrylate resin was carried out as follows:

10 grams of the resin were suspended in 100 cc. of 1,4-dioxane. No solution occurred. Upon the addition of 15 cc. of concentrated hydrochloric acid, a gelatinous dope was obtained. This mass was placed upon a steam bath under a reflux condenser. When it became hot, 10 grams of mossy tin were added. After heating for 25 minutes, 5 cc. more of concentrated hydrochloric acid were slowly added with vigorous stirring to prevent precipitation. The reaction was heated for an additional three hours. It was then removed from the steam bath, diluted with an equal volume of 1,4-dioxane, filtered and precipitated in methyl alcohol. A yellow product was obtained which was washed with methyl alcohol and dried at room temperature at reduced pressure.

A portion of the reduced resin was suspended in water, being insoluble therein. The water was acidified with hydrochloric acid and the mixture was cooled. The suspended resin was diazotized by the addition with stirring of 10% sodium nitrite solution. It was then poured into an aqueous solution of β-naphthol containing an excess of sodium hydroxide. The suspension changed in color to an orange-red. The product was filtered from the liquid, washed with distilled water and dried.

The reduction of nitrated dihydronaphthalene-maleic anhydride heteropolymer was as follows:

10 grams of the resin were dispersed in 100 cc. of 1,4-dioxane and reduced by two successive portions each of 10 grams of mossy tin and 50 cc. of concentrated hydrochloric acid. The mass was heated for 3 hours after the last addition of tin and was filtered, precipitated and the precipitate was washed with acetone. The resulting resin was dried at reduced pressure. It contained 4.3% of amino nitrogen.

The product was diazotized and coupled as described under the reduction of nitrated polydihydronaphthalene. A deep red solution was obtained from which the color could not be filtered. The filtrate was acidified with concentrated hydrochloric acid whereupon a deep red resin dye precipitated.

The reduction of nitrated coumarone-indene resin was carried out as follows:

20 grams of the nitrated resin were dispersed in 200 cc. of 1,4-dioxane and 20 cc. of distilled water. The procedure for reduction was similar to that described under the reduction of polydihydronaphthalene except that the precipitation was in acetone alone. The product contained 6.5% of amino nitrogen. Upon diazotization and coupling with β-naphthol, as described, a dark wine colored resin dye was obtained.

The reduction of nitrated phenol-formaldehyde resin was carried out by dispersing 20 grams of the nitrated resin on a steam bath in 150 cc. of 1,4-dioxane. The reduction was carried out as described in the preceding example. The resulting resin contained 5.1% of amino nitrogen. Upon diazotization and coupling with β-naphthol, as described previously, a deep red insoluble resin dye was obtained.

The nitrated polystyrene resin may be reduced either in dioxane or in water. The reduction using dioxane was as follows:

10 grams of a nitrated low molecular weight polystyrene resin were suspended in 100 cc. of 1,4-dioxane. 20 cc. of concentrated hydrochloric acid and 10 grams of mossy tin were added and the suspension was placed upon a steam bath under a reflux condenser. At the end of about an hour partial solution was evident. 10 grams more of mossy tin and 50 cc. of concentrated hydrochloric acid were added and the heating was continued for an additional three hours. A further addition of a like quantity of mossy tin and concentrated hydrochloric acid was made. Heating was continued for an additional half hour. The mass was removed from the steam bath and filtered. The filtrate became cloudy on cooling. Sufficient distilled water was added to remove the cloudiness. A clear brown thin dope was obtained. This was precipitated in acetone and washed with acetone. A tan powder which was soluble in water and dilute hydrochloric acid but insoluble in 10% sodium hydroxide was obtained which contained 7.61% of amino nitrogen.

On diazotizing in cold dilute hydrochloric acid with 10% sodium nitrite solution and coupling with β-naphthol in an excess of 10% sodium hydroxide, a bright red resin dye precipitated from the solution.

The reduction of the nitrated polystrene in water was carried out as follows:

200 grams of a powdered nitrated low molecular weight polystryrene resin was suspended in 2500 cc. of distilled water in a flask equipped with a mechanical stirrer and a reflux condenser. 400 grams of mossy tin and 2000 cc. of concentrated hydrochloric acid were added and the mixture was heated with stirring on a steam bath. After 21 hours of heating, the suspended material had gone completely into solution to give a clear brown dope. The solution was filtered and precipitated in an excess of acetone with stirring. The precipitate was filtered off, washed with acetone and dried at diminished pressure. It contained 8.2% of amino nitrogen.

The reduction of the nitrated styrene-acrylic acid copolymer was as follows:

10 grams of the resin were dispersed in 90 cc. of 1,4-dioxane and 10 cc. of water. 10 grams of mossy tin were added and the mass was heated on the steam bath under a reflux condenser. When the mass was refluxing gently, 25 cc. of concentrated hydrochloric acid were added. 20 cc. of dioxane was added and a little later 25 cc. of concentrated hydrochloric acid was poured in. Fifty minutes after the reaction had started, an additional 10 grams of mossy tin and 50 cc. of hydrochloric acid were added. After 20 minutes of further reduction, 20 cc. of water was added. Three hours after the last addition of tin and hydrochloric acid, the mass was removed from the steam bath, filtered, and precipitated in an excess of acetone. A yellow flocculent precipitate was obtained. The precipitate was washed with acetone and dried at reduced pressure. The product contained 5.9% of amino nitrogen.

The product was dissolved in water, diazotized, and then coupled with β-naphthol in an excess of 10% sodium hydroxide. The filtrate was acidified with concentrated hydrochloric acid whereupon the resin dye separated from the solution as a bright red precipitate.

The resin dyes of our invention are especially useful for photographic purposes, such as antihalation backings for photographic films, or as colored overcoatings for photographic films. When soluble in alkali they may be removed from the film during its development. When carboxyl groups are present in the colored resin, their products may be esterified, such as with a simple or a polyhydroxy alcohol and the resulting material because of its large molecular size and inherent color is suitable either alone or mixed with other plastic materials for making commercial products, such as molded objects, sheeting, lacquers or threads.

We have also found that the polymers having aromatic amino groups are useful for photographic purposes, for instance as a protective colloid to prevent agglomeration of particles of silver halide such as the chloride or bromide. For example, the amino styrene-maleic anhydride resin as the hydrochloric acid salt was dispersed in water to form a solution containing about 1% of resin. A sufficient amount of a 5% aqueous silver nitrate solution to react with the chloride ion present was added. A faint opalescence was produced and the silver halide appeared as a very finely divided colloidal suspension when the solution was boiled. This suspended silver chloride did not show a substantial amount of precipitation even upon standing for several days at room temperature.

The above paragraph illustrates the dispersing action of an amino resin prepared in accordance with our invention. The various other amino resins were also employed with silver halide as follows:

To about 10 cc. of an approximately 1% solution of the amino resin in water, equal molar proportions of sodium chloride and silver nitrate solution were added with shaking. The solutions were examined after addition, after which they were heated to boiling and the effect of boiling noted. The results in each case were as follows:

*Amino indene-coumarone resin.*—No precipitation or opalescence occurred when 2 cc. each of tenth normal sodium chloride and silver nitrate solution were added. Boiling had no effect. The addition of 2 cc. each of normal sodium chloride and silver nitrate caused only slight turbidity after boiling. There was no change after standing for 6 hours at room temperature.

*Aminopolydihydronaphthalene.* — No opalescence was noted when 2 cc. each of tenth normal sodium chloride and silver nitrate were added. None was noticed after boiling. A finely divided suspension of silver halide was formed when 2 cc. each of N sodium chloride and silver nitrate were added to the cold solution. Boiling appeared to have no effect. After 6 hours standing at room temperature, there was some precipitation but a finely divided colloidal suspension of silver chloride was present in the supernatant liquid.

*Aminostyrene-acrylic acid.*—When 2 cc. of tenth normal sodium chloride and silver nitrate were added in the cold, some turbidity was noted. On boiling, the turbidity increased to give a finely divided colloidal suspension of silver halide. After 5¾ hours stand at room temperature, a major portion remained as a finely divided colloidal suspension although some precipitation was present.

*Polyaminostyrene.*—No turbidity was evident when 2 cc. of tenth normal sodium chloride and silver nitrate were added to the cold solution. On boiling, turbidity appeared and increased to give a finely divided colloidal suspension of silver halide. After 5½ hours standing, there was no apparent precipitation of the colloidal particles.

*Amino phenol-formaldehyde resin.*—No turbidity was evident when 2 cc. each of tenth normal sodium chloride and silver nitrate were added. None appeared on boiling. When 1 cc. of normal sodium chloride and silver nitrate were added, turbidity appeared which increased somewhat with boiling to give a finely divided suspension of silver halide. After 5½ hours standing, the colloidal suspension remained unbroken.

*Amino dihydronaphthalene-maleic acid.*—No opalescence was noticed when 2 cc. each of tenth normal sodium chloride and silver nitrate were added. Upon boiling, turbidity appeared due to a finely divided suspension of silver chloride. After standing more than 5 hours, there was no evidence of settling.

It may be seen from the above results that substantial amounts of nitrogen in the form of a nitro group may be introduced into resins containing benzenoid nuclei. In all the resins, analysis indicated that nitro nitrogen was introduced in an amount of at least one nitro group for each benzenoid ring present. In some cases this amount was exceeded but in no case were two nitro groups found in each ring. Herein whereever the term "amino resin" is used, it refers to the salt of the amino resin and not to the free amine. In some instances the free amines are not water soluble, whereas as a rule the salts of the amine resins are soluble in water.

In the case of silver halide, the dispersing action of the resin may be utilized in the formation of light sensitive silver halide emulsions in the presence of gelatin or other carriers. For certain purposes the resin itself might be employed as a carrier for the silver halide.

The resin dye compounds of our invention may be used as non diffusing colors in photographic film or any other place where the fixation of color is desirable. This may be accomplished by incorporating the azo dye forming compound in the photographic emulsion and then treating with the diazotized resin or vice versa. In this way a stable anchored coloration is imparted. This procedure may also be employed in dyeing cloth or thread by first wetting the cloth in a diazonium dip, containing the diazotized resin, and then dipping the cloth in a coupling compound, thus giving firm fixation or the color. These resin dyes may also be employed as pigments as, due to their large molecules and the addition of the color-forming compound to a resin, a highly stable color results.

In addition to the compounds listed above, our invention also includes resins in which styrene, dihydronaphthalene, coumarone, indene, or other polymerizable substances containing benzenoid nuclei are heteropolymerized with an ethylene alpha, beta-dicarboxylic acid, its anhydride, or its derivatives. Acids of this type are fumaric, citraconic, ethyl-maleic, etc.

The amino resins may be used for the formation of threads, lacquers, films, or molded objects. They may also be used in photographic film as a support for the emulsion, or as an antistatic, antihalation, or abrasion resistant layer. They may also be used as interlayers between the emulsion and support of photographic film. If desired pigments, fillers, plasticizers, antioxidants, or dyes may be added to modify their properties for the above mentioned uses. Such resins may also be incorporated with other polymeric materials to modify the properties.

In the reducing reactions other diluents than dioxane, such as water or dilute acetic acid, may be employed to disperse the reactants.

It is to be understood that "benzenoid" is to be given its customary meaning referring to all groups having a benzene like structure therein as opposed to the quinoid type of cyclic structure. This term includes benzene, naphthalene and phenanthrene groupings. The terms maleic anhydride and maleic acid may be used herein to refer to resins which might have both groups present as the anhydride easily hydrolyzes to some extent to the acid.

We claim:

1. A resin-dye comprising a resinous polymerization product containing a benzenoid group therein, joined through an azo linkage with an azo-dye-coupling component.

2. A resin-dye comprising a resinous polymerization product of styrene and a compound having the following formula:

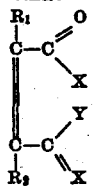

R and $R_1$ being substituents selected from the group consisting of hydrogen, halogen, sulfonic acid, alkyl, aryl and aralkyl radicals and X and Y being substituents selected from the group consisting of OH and oxygen, the latter when used taking care of both X and Y, joined through an azo linkage with an azo-dye-coupling component.

3. A resin-dye comprising the heteropolymer of styrene and a maleic compound selected from the group consisting of maleic acid and maleic anhydride, coupled through an azo linkage with an azo-dye-coupling component.

4. A resin-dye comprising the heteropolymer of styrene and maleic anhydride, coupled through an azo linkage with an aromatic compound containing an activating group attached to the ring.

5. A resin-dye comprising a resinous polymerization product of a compound containing a benzenoid group and a compound having the following formula:

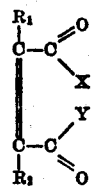

$R_1$ and $R_2$ being substituents selected from the group consisting of hydrogen, halogen, sulfonic acid, alkyl, aryl and aralkyl radicals, X and Y being a substituent selected from the group consisting of OH and O, the latter substituent when used taking care of the X and Y together, joined through an azo linkage with an azo-dye-coupling component.

6. A resin-dye comprising a resinous polymerization product of a compound containing a benzenoid group and a compound containing radicals of an ethylenic monocarboxylic acid, joined through an azo linkage with an azo-dye-coupling component.

7. A resin-dye comprising a resinous polymerization product of a compound containing a benzenoid group and a compound containing acrylyl groups, joined through an azo linkage with an azo-dye-coupling component.

8. A resin-dye comprising a resinous polymerization product of a compound containing a benzenoid group and a compound containing unsaturated organic acid radicals, joined through an azo linkage with an azo-dye-coupling component.

9. A colored resin comprising a styrene-maleic anhydride heteropolymer chemically coupled through an azo linkage with alpha naphthol.

10. The process of preparing a colored resin from a polymer containing a benzenoid group which comprises nitrating the group, subjecting the nitrated polymer to a reducing action to form an amine and subsequently diazotizing the polymer and coupling it through an azo linkage with an azo-dye-coupling component.

11. The process of preparing a colored resin from the heteropolymer of styrene and a compound selected from the ethylene-alpha-beta-dicarboxylic acids and their anhydrides, which comprises nitrating the polymer, subjecting the nitrated polymer to a reducing action to form an amine and subsequently diazotizing the polymer and coupling it through an azo linkage with an azo-dye-coupling component.

12. The process of preparing a colored resin which comprises nitrating a styrene-maleic anhydride heteropolymer, reducing the nitrated polymer, diazotizing the amine formed by the reducing action and then diazotizing the polymer and coupling it through an azo linkage with an azo-dye-forming component.

13. The process of preparing a colored resin which comprises nitrating the heteropolymer of styrene and a compound selected from the group consisting of the ethylene-alpha-beta-dicarboxylic acids and their anhydrides, reducing the nitrated polymer to form an amine and subsequently coupling by means of an azo linkage the amino-heteropolymer with an aromatic compound containing a hydroxyl attached to the ring.

14. The process of preparing a colored resin which comprises nitrating the heteropolymer of styrene and a compound selected from the ethylene-alpha-beta-dicarboxylic acids and their anhydrides, reducing the nitrated polymer to form an amine and subsequently coupling by means of an azo linkage the amino-heteropolymer with an aromatic compound containing an amino group attached to the ring.

WILLIAM O. KENYON.
LOUIS M. MINSK.
GEORGE P. WAUGH.